(No Model.)
J. A. ADAMS.
CUT-OFF FOR WATER SUPPLY PIPES.
No. 374,162. Patented Dec. 6, 1887.
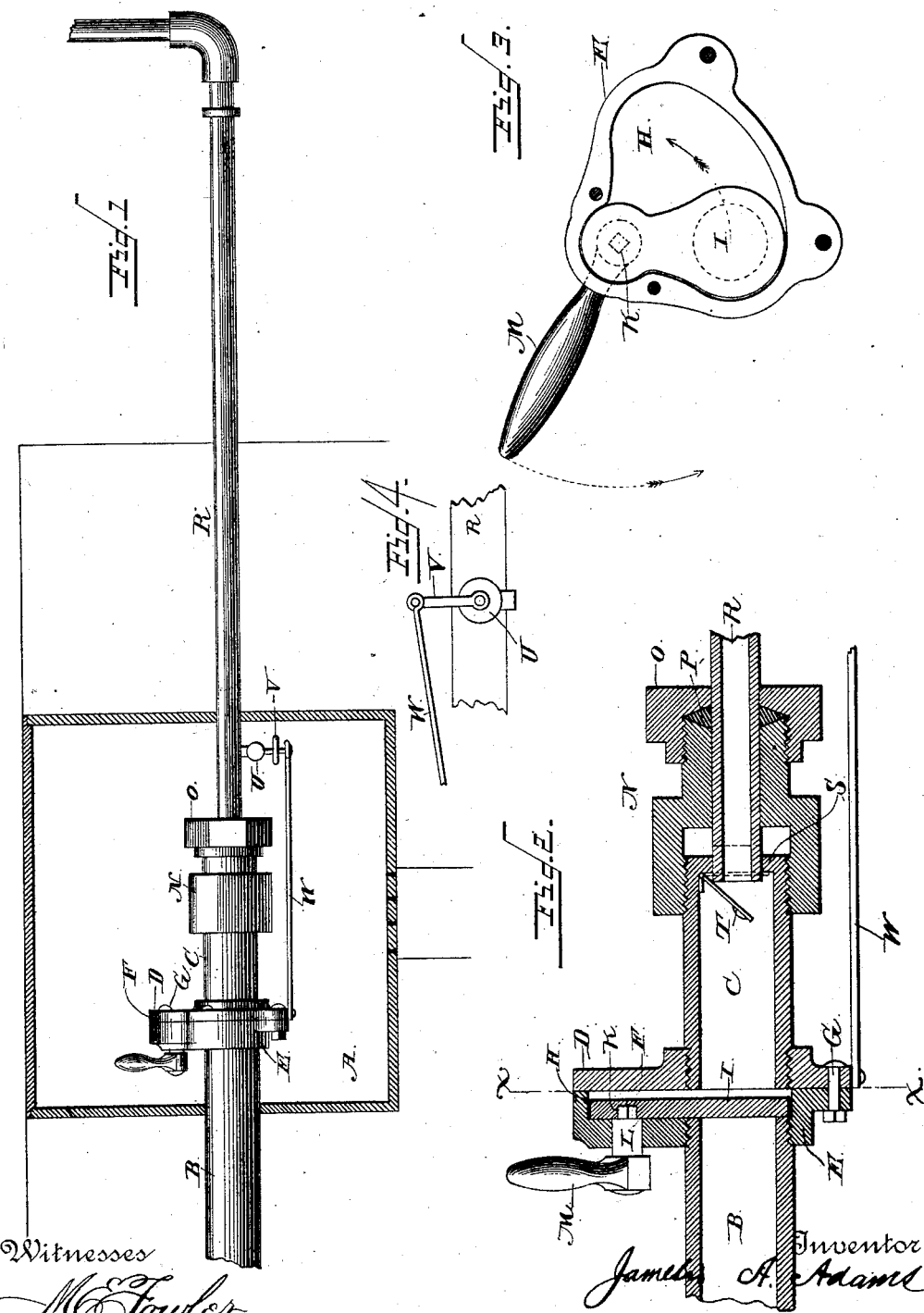

UNITED STATES PATENT OFFICE.

JAMES A. ADAMS, OF ATLANTA, GEORGIA.

CUT-OFF FOR WATER-SUPPLY PIPES.

SPECIFICATION forming part of Letters Patent No. 374,162, dated December 6, 1887.

Application filed April 12, 1887. Serial No. 234,534. (No model.)

*To all whom it may concern:*

Be it known that I, JAMES A. ADAMS, a citizen of the United States, residing at Atlanta, in the county of Fulton and State of Georgia, have invented a new and useful Improvements in Cut-Offs for Water-Supply Pipes, of which the following is a specification.

My invention relates to an improvement in cut-offs for water-supply pipes adapted to be operated by changes of temperature; and it consists in the peculiar construction and combination of devices, that will be more fully set forth hereinafter, and particularly pointed out in the claims.

In the accompanying drawings, Figure 1 is an elevation of an apparatus embodying my improvements. Fig. 2 is an enlarged vertical longitudinal sectional view of a portion of the same. Fig. 3 is an enlarged detail sectional view taken on the line $x$ $x$ of Fig. 2. Fig. 4 is an inverted plan view of a portion of my improved apparatus.

A represents a box or case, which is buried underground and has an opening in its lower side communicating with a sewer or drain.

B represents the main water-pipe, which is buried underground in the usual manner, and one end of the said main pipe enters the box or case A.

C represents a short pipe of the same diameter as the main pipe, and is coupled to the inner end of the same by a valve-case, D. The said valve-case comprises two sections, E and F, which are screwed to the meeting ends of the pipes B C, respectively, and are secured together by transverse bolts G. The inner side of the section E is provided with a recess, H, in which is seated a cut-off valve, I, that is adapted to close the inner end of the pipe B, as shown at Figs. 2 and 3, and thereby cut off the supply of water when it becomes necessary to do so in order to make repairs. The valve bears snugly against the face of the recess H, as shown at Fig. 2, and has near its upper end a squared recess, K, adapted to receive the squared inner end of a spindle, L, which is journaled in a transverse opening in the section E. To the outer end of the spindle is secured a handle, M, by means of which the valve may be operated.

To the outer end of the pipe C is screwed a packing-box, N, having a screw-cap, O. A recess is formed between the end of the packing-box and the opposing inner side of the screw-cap for a packing, P, of suitable material.

R represents the service-pipe, which extends to a hydrant or plug (not shown) and has its inner end fitted in and extending through the bore of the packing-box and communicating with the outer end of the pipe C. This pipe R is preferably made of brass or other material which is readily expanded and contracted by heat and cold, and its inner end is free to slide in the packing-box. The diameter of the pipe R is considerably less than the diameter of the pipe C, and thereby the outer end of the latter has a shoulder or flange, S, surrounding the inner projecting end of the service-pipe. A valve, T, is hinged to the upper side of the shoulder or flange S, and under ordinary climatic conditions is supported by the inner projecting end of the service-pipe at such an angle as to keep the inner end of the said pipe open, as shown in Fig. 2. A portion of the pipe R is above ground and exposed to the weather.

From the lower side of the pipe R depends a cock or faucet, U, having a crank-arm, V, to turn its plug, and thereby open or close the faucet.

W represents a rod which connects the lower side of the valve-case D and the crank-arm of the faucet.

The operation of my invention is as follows: When the valve T is in the position shown in Fig. 2, the cock or faucet U is closed. The valve I is of course normally open, and the water from the main flows into the pipe C and through the same to the service-pipe. When the temperature lowers to the freezing-point, the service-pipe R contracts, and as the outer end thereof, connected to the hydrant or plug, is held fast and cannot move its inner end is caused to move outward from the pipe C and in the packing-box, and thereby lowers the valve T to a vertical position, causing the said valve to close the inner end of the service-pipe, and thereby cut off the supply of water to the hydrant or plug. As the faucet or cock U is connected to the service-pipe near its inner end, it follows that the said faucet or cock moves outward with the service-pipe as the latter contracts, and the inner end of the rod W being connected to a fixed point and the outer end thereof being connected to the crank-arm of the faucet the plug in the latter is caused to turn, so as to open the faucet, and as a consequence the water in the service-pipe is drained therefrom into the box or case A, and from the same into the sewer, and all danger of freezing the water in the service-pipe is obviated. As soon as the temperature rises, the service-pipe expands and opens the valve T and closes the cock or faucet U, as before.

Having thus described my invention, I claim—

1. The combination of the main, the service-pipe R, adapted to be contracted and expanded by changes in temperature and having its inner end entering the main, and the valve T, arranged over the inner projecting end of the service-pipe, for the purpose set forth, substantially as described.

2. The combination of the main or other source of water, the service pipe communicating therewith and adapted to be contracted and expanded by changes of temperature, the valve T in the main pipe at the inner end of the service-pipe, for the purpose set forth, and the cock or faucet secured to the service-pipe and having its handle or lever connected to a fixed point, whereby when the service-pipe contracts the valve will be closed and the cock or faucet will be opened simultaneously, for the purpose set forth, substantially as described.

3. The combination of the main having the packing-box, the service-pipe adapted to be contracted and expanded by changes of temperature and having its inner end extending through the packing-box and projecting slightly into the main, and the valve T, secured in the main and bearing on the inner projecting end of the service-pipe, whereby when the latter contracts the valve will close its inner end, and thereby cut off communication with the main, substantially as described.

In testimony that I claim the foregoing as my own I have hereto affixed my signature in presence of witnesses.

JAMES A. ADAMS.

Witnesses:
    E. G. SIGGERS,
    WM. N. MOORE,
    MYRTLE STALNAKER.